United States Patent [19]

Braun et al.

[11] Patent Number: 5,894,771
[45] Date of Patent: Apr. 20, 1999

[54] PIPE CUTTING MACHINE AND PROCESS FOR CUTTING PIPE PIECES FROM A PIPE BLANK

[76] Inventors: Hans-Jorg Braun, Am Meerbusch 5, 4005 Meerbusch 2; Gerhard Mohn, Hohle Strasse 12a, 51702 Bergneustadt, both of Germany

[21] Appl. No.: 08/643,620

[22] Filed: May 6, 1996

[30] Foreign Application Priority Data

May 4, 1995 [DE] Germany .......................... 195 16 035
Apr. 4, 1996 [DE] Germany .......................... 196 13 500

[51] Int. Cl.⁶ .................................................. B23B 5/14
[52] U.S. Cl. ............................ 82/47; 82/48; 82/70.2; 82/113
[58] Field of Search ........................... 82/1.11, 47, 48, 82/59, 60, 70, 70.1, 70.2, 89, 100, 101, 102, 113, 123, 124, 131, 130, 133, 134; 83/54

[56] References Cited

U.S. PATENT DOCUMENTS

| | | | |
|---|---|---|---|
| 3,191,205 | 6/1965 | Gilbert | 82/133 X |
| 3,863,528 | 2/1975 | Wiesner | 82/133 |
| 4,430,913 | 2/1984 | Williamson | 82/70.2 |
| 4,776,247 | 10/1988 | Kiya | 82/118 |
| 5,335,570 | 8/1994 | Ro | 82/89 X |
| 5,458,031 | 10/1995 | Wolff | 82/101 X |

FOREIGN PATENT DOCUMENTS

| | | | |
|---|---|---|---|
| 0738759 | 7/1966 | Canada | 82/134 |
| 0425994 | 12/1994 | European Pat. Off. . | |
| 877689 | 5/1953 | Germany . | |
| 001510989 | 9/1989 | U.S.S.R. | 82/133 |

OTHER PUBLICATIONS

Office Action in German Examination of German Patent Application S.N.19516035.5-14. Office Action is Dated Dec. 20, 1995.

*Primary Examiner*—Frances Han
*Assistant Examiner*—Henry W. H. Tsai

[57] ABSTRACT

Process and arrangement for cutting and/or chamfering pipe front rims of pipes, in particular thick-walled pipes which are used for manufacturing ball bearings. The process includes the steps of measuring the actual external diameter of the pipe or inputting the data of the nominal external diameter of the pipe, moving of at least one cutting head towards abutting contact with the exterior surface of the pipe in a rapid transverse motion in accordance with measurements stored in a control unit, switching the feed motion and/or the cutting speed to conform to the machining process which has been adapted to the material of the pipe for the rapid cutting of a ring piece from the pipe blank. The external periphery of the pipe generally consisting of a hard zone which is being cut by a slower cutting speed and said cutting speed is increased once said hard zone has been fully traversed by the cutting tools mounted on the cutting head.

18 Claims, 2 Drawing Sheets

PIPE CUTTING MACHINE AND PROCESS FOR CUTTING PIPE PIECES FROM A PIPE BLANK

BACKGROUND OF THE INVENTION

The invention relates to a pipe cutting and/or chamfering machine and to a process for cutting pipe sections from a pipe blank, in particular for cutting ring pieces from thick walled pipe blanks which ring pieces are adapted to be used in the manufacture of ball bearings.

Pipe cutting and/or chamfering machines of this type generally include a cutting head and clamping jaws which bear radially against the exterior surface of the pipe blank, a rotating face plate for uptake of at least one radially adjustable cutting tool and optionally at least one radially adjustable chamfering tool. This type of pipe cutting machine generally includes a clamping mechanism for grasping a cut pipe section and depositing it for further processing. This type of state of the art pipe cutting machine is described in the European patent No. 0 425 994 of the applicant herein.

In this known type of pipe cutting machine the pipe blank is deposited on a transport roller bed the parallel rollers of which are in alignment with the cutting head and at least one which is rotatably driven. By means of the driven roller(s) the pipe blank is transported through the cutting head and face plate against an adjustable stop member and then is clamped by means of clamping jaws. Thereafter the cutting operation is carried out. The stop member must be of rugged construction because it must not only properly position the pipe blank end, but must also absorb the inertial forces of the forward movement of the pipe blank, which is thick-walled and consequently has a large mass. After the pipe blank has been clamped by the clamping jaws the stop member is moved away from the pipe blank end in order to permit the clamping of the pipe section, which is to be cut off, to be grasped by the clamping mechanism and then to be deposited for further handling. Since this operational cycle repeats itself after each pipe blank feed advance, down times of the machine result which decrease the output of cut pipe sections. Furthermore, tolerance deviations of the width of the cut pipe sections may occur, in particular when, for example, metal chips or borings may lodge between the stop member and the end face of the pipe blank.

While the feed motion of the pipe blank by means of one or more driven rollers of a transport bed composed of a plurality of parallel rollers constitutes a relatively simple construction, it does, however, not permit the feed advance to be precisely adjusted to a given value. It is therefore necessary to move the pipe blank in each operational cycle with its end face against the adjustable stop member. Because there will inevitably occur in such an arrangement wear on the exposed cutting surfaces of the cutting tool, there results a gradual widening of the cut pipe section which can only be corrected if there is provided an adjustment mechanism for the stop member preferably along an additional CNC-axis.

In order to assure that the end face of the pipe blank abuts flush against the stop member, it is necessary to construct the roller bed so that, at the moment of contact by the stop member with the end face of pipe blank, there remains a sufficient driving force to cause a small additional rotation of the driven roller. This causes a high wear off the roller surface.

Finally an other drawback of the state of the art machines resides in the large waste of pipe section material that occurs in view of the fact that the transport rollers must be arranged in front of the input of the cutting head and a further advance of the pipe blank is no longer possible when no portion of the pipe blank is disposed on top of the driven roller. Furthermore, this pipe blank remnant can also not be further processed since a new pipe blank is used to move the pipe blank remnant through the cutting head. Since this pipe blank remnant is only still held by the clamping jaws in the cutting head, which have a small axial length relative to the axial length of the pipe blank remnant, these clamping jaws are therefore not suitable for holding and aligning the pipe blank remnant in an exact horizontal direction. The pipe blank remnant tilts and oblique pipe sections result from further cutting operations.

It is, of course, understood that ball bearings must be mass produced and preferably in a fully automatic operation with efficient as possible a use of the production machinery in order to minimize as much as possible the material losses due to cutting and/or machining in view of the raw material for ball bearings being expensive high alloy steel. Furthermore, the wear of the expensive machine cutting tools must be as low as possible. Low material losses can be realized by using band saws for machining the ball bearing rings which have a cutting width of 2 millimeter maximum. The cutting velocity of such a band saw is, however, not high and the useful service life of such band saws is low. This is due to the fact that a band saw can basically only cut transversely through a pipe and encounters throughout the cutting process hard zones in the region of the external and internal diameters of the pipe. To this must be added the fact that the cutting operation can not be carried out exactly normally to the pipe axis because the elastic unguided band saw can easily deviate from a preselected path in the region of the pipe, which makes a subsequent planing operation of the cut rings always indispensable.

SUMMARY OF INVENTION

It is a general object of this invention to provide an improved process for cutting ring pipe sections out of a pipe blank, in particular pipe sections out of thick-walled pipe blanks, as well as a machine for carrying out this process. By means of this novel process cut pipe sections are produced with high machine efficiency, low metal chips waste and optionally without the necessity of using a stop member. The machine in accordance with the invention cuts the pipe sections rapidly, with high precision and precisely normally to the longitudinal pipe axis with low machine tool wear.

Keeping this general object of the invention in mind the inventive process includes the following steps:

a) measuring the actual external diameter of the pipe blank in the region of the of the location of the cut on the pipe blank or inputting the nominal external diameter into the computer control of the cutting machine;

b) moving in a rapid motion at least one cutting tool into the proximity of the exterior surface of the of the pipe blank;

c) adjusting the stepwise feed advance and/or the cutting velocity to the type of material forming the pipe blank for obtaining a rapid cutting of a pipe section ring.

By only using a cutting step for cutting the pipe sections in lieu of using also band saws, the cutting velocity can be substantially increased and a completely plane, precisely normal to the pipe axis cut surface is obtained, which, in contradistinction to surfaces obtained by band sawing, does not require any subsequent planing. The cutting step in this novel process can be carried out by a cutting tool which is no wider than a band saw, so that, in comparison with state of the art cutting processes, expensive material is not wasted by machining.

In accordance with one feature of the inventive process, which is of particularly advantageous application when cutting pipe blanks or tubing having an extra hard zone in the region of the external diameter, an additional step is carried out which is as follows: after the rapid return motion and before the cutting operation the stepwise feed motion and/or cutting velocity is switched to a lower value for cutting of the extra hard zones. By using this extra process step this hard zone can be precisely cut without linear deviation of the cutting tool and without excessive wear of the cutting tool. In this way the wearing out rate of the cutting tool is considerably decreased. This is particularly significant when the pipe blank or tubing is cut with reduced feed and/or reduced cutting speed, which increases the useful life of the cutting tool. This also makes it possible to construct the cutting tool narrower and in this way a lesser amount, i.e. a less expensive amount of metal needs to be machined, i.e. the raw material losses are decreased. Although it is necessary that the clamping jaws must have a large collar length, because of the large wall thickness of the pipe blank or tubing, in the narrow region which supports the cutting plate, which inherently has a reduced stiffness in the direction of the tube axis, nevertheless, a linear deviation of this cutting plate due to the slow cutting of the hard zone can be avoided.

The slow cutting of the hard zone serves therefore not only for reducing the wear of the cutting tool, but also for achieving a precise non-deviating starting point for the cutting step.

It is to be understood that the term "hard zone" of the to be machined pipe blank or tubing describes a hard rolled skin, or a hard cast skin or also a hard skin which forms as a result of the alloy composition and the cooling speed of the thick-walled pipe or tubing after rolling during which a hard skin forms either only in the region of the external diameter or also in the region of the internal diameter.

In accordance with a further feature of the inventive process a switching over to a slower feed and/or the cutting speed to a lower value can also be effected when the cutting tool approaches the internal diameter, in order to reduce the wear in this region and additionally, at the completion of the cutting of the pipe blank or tubing, to achieve a reduced metal burr production and a complete separation of a thin and clean cut ring chip.

In order to reduce the downtimes to a minimum, there can additionally be provided a measuring of the cutting force during the cutting in order to remove the cut ring piece by means of a gripper as soon as a control unit indicates that the cutting force falls below a given value.

There is therefore provided, as a further advantageous feature of the inventive process, the possibility of cutting pipe pieces precisely normally to the pipe axis without using a stop member arrangement. This process includes the following steps:

a) inserting the pipe blank or tubing into pipe cutting machine;
b) gripping of the pipe blank by means of a slip-free feed gripping unit;
c) CNC-controlled feed movement of the pipe blank by means of the feed unit;
d) detecting arrival of the pipe end by means of a scanning unit prior to sliding it into the cutting head provided with clamping;
e) CNC-controlled feed of the pipe blank over a given width of the to be cut pipe blank including the cutting width starting from the previously determined pipe end position;
f) cutting and optionally chamfering of the pipe piece; and
g) repetition of the process and the cutting step in a new operational cycle.

This inventive process is based on the concept that a stop member can be dispensed with and the drawbacks which are associated with the use of such a stop member can be avoided. This is achieved by detecting the position of the pipe end which has been clamped in the cutting head when it is in a preselected position and then the slip-free operating feed unit is driven in such a way that it transports the pipe blank for the cutting step through the cutting head exactly a distance corresponding to the width of the to be cut pipe piece and to the width of the cutting tool. Thereafter the pipe blank is again grasped and the operational cycle is repeated.

It is particularly noteworthy in this inventive process that during the insertion feed advance of a new pipe a defined pipe end position may be determined in which the pipe end face is subjected to a short planing step. In this way soiling on the pipe end face is removed and end faces which are not precisely normal to the pipe axis are machined to provide a reference surface which may be the surface which serves as the starting point for the CNC-controlled feed advance corresponding to the width of the to be cut pipe piece.

The wear on the machine tools which are used for planing the pipe end face and for cutting the pipe pieces can be easily compensated for by the feed mechanism. This compensation can be effected by either measuring the width of the cut pipe piece and the feed is corrected accordingly or a correction value is input in the control unit which causes an automatic adjustment of the feed.

In order to obtain as short as possible a remnant piece of the pipe, it is advantageous to stepwise advance the pipe blank to such an extent by means of clamping jaws of a feed mechanism, which grips the pipe from the inside, until only a pipe remnant corresponding to the required gripping length remains in the cutting head. This pipe remnant is then retracted by means of the feed mechanism from the cutting head and this retracted pipe remnant is then discarded.

In order to avoid damaging the cutting tool by the pipe end face during retraction and after the cutting operation and to avoid the formation of spiral grooves on this surface and an optional chamfering of the pipe piece is important. This can be accomplished by retracting the pipe piece over a short path by means of the feed mechanism after the opening of the clamping jaws of the cutting head. The cutting tool and optionally the chamfering tool are not contacted during this retraction and the feed path for the cutting and optionally chamfering of a further pipe piece is enlarged a distance corresponding to the retraction.

Since the pipe mass of the pipe blank decreases with each cutting operation, it is advantageous to adjust the acceleration and velocity of the pipe feed step in dependency of the remaining pipe mass in the sense of an increase with the decrease of the pipe blank mass. The operational problem outlined hereinabove is solved in the present invention by providing a pipe cutting machine which has an adjustable feed unit which seizes or grips the pipe in a slip free manner and advances it in relation to the pipe section which is to be clamped in the cutting head by a predetermined width of the to be cut pipe piece.

A CNC-controlled feed unit is advantageously used which effortlessly controls with high precision the feed steps.

In order to obtain a starting point relative to the pipe end, during the insertion of a pipe blank into the cutting head, a detecting element arranged at a predetermined distance ahead of the cutting head can be provided, detecting the passage of the pipe and to be clamped in the cutting head.

A required feed step of a certain length can then be selected by means of the control unit which takes the contact element as a starting point and effects a traverse of the pipe through the cutting head and the planing disc over such a distance, that a pipe portion to be cut is located in the region of the cutting head which has precisely the required width.

The slip-freely operating feed unit can consist of a pair of drive rollers which graspingly bilaterally contact the pipe, a pair of driven pulleys or chains the surface of which is constructed in such a way that they can provide a slip-free feed.

The feed unit is, however, preferably provided with clamping jaws for interiorly clamping the pipe end. These clamping jaws clamp the pipe end opposite to the pipe end positioned in the cutting head. Since this feed unit clamps the pipe end with its clamping jaws, an absolutely slip-free drive is thereby formed, which provides the additional advantage that the pipe can be transported far into the cutting head. By means of this feature of the invention, only a pipe remnant remains in the feed unit which corresponds in length to the axial distance of the clamping jaws in the cutting head, respectively of the clamping jaws in the feed unit.

In order to exactly orient the pipe in a horizontal plane, independently from the eccentricity or oval inner cross section of the pipe relative to its exterior diameter, it is advantageous to provide a support at the feed unit which is at least vertically adjustable, preferably in all lateral directions adjustable at every side, and can be locked in the adjusted position.

The feed unit may include a carriage which supports the mount for the clamping jaws and which can be slidably mounted on longitudinal guides of the machine bed.

In order to facilitate the insertion of a pipe blank into the pipe cutting machine and in order to support very long pipes or tubes without bending them, there can be furthermore be provided support rollers for the pipe in the machine bed. These support rollers may advantageously be vertically adjustable in order to adjust the position of the pipe resting on the support rollers relative to pipe axis of the actual external diameter. In order to cut through hard zones in the region of the external diameter and in the region of the internal diameter with reduced feed and/or reduced cutting speed, it is advantageous to determine the actual external diameter and/or internal diameter of the the pipe blank. This can be achieved by providing the cutting head and/or the feed unit with a clamping piston which is axially slidable and has radially clamping jaws. The clamping piston is coupled with a displacement pick up unit for scanning and determining the actual external diameter and/or the actual internal diameter of the pipe which is geometrically connected with the displacement of the clamping piston.

The actual exterior diameter can also be determined with the aid of a displacement pick up unit at a clamping unit having a gripper for the to be cut pipe piece.

Finally, it is also possible to determine the actual external diameter prior to the front end of the pipe being slid through the cutting head. This can be effected by using a diameter measuring unit, preferably a laser measuring unit, which measures the actual external diameter at a distance from the cutting region and then transmits the measured value to the control unit for the cutting machine.

If the actual external diameter is determined in the aforedescribed manner or by other means, the cutting tool can be rapidly moved in close proximity to the external surface of the pipe which causes a further reduction of the down times of the cutting machine.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION

Figure 1:
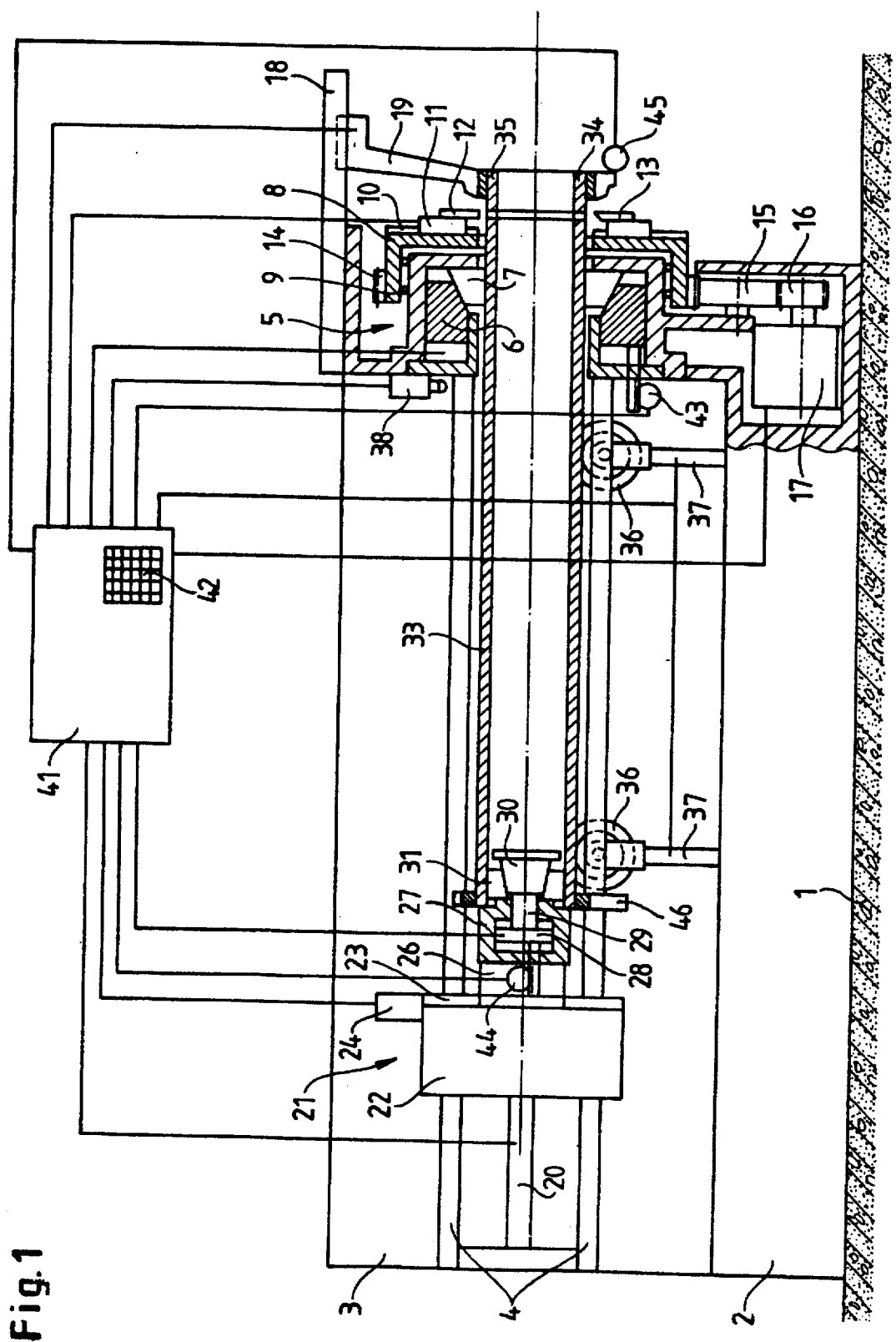
FIG. 1 is a side elevational view, partially in cross-section, of the pipe cutting machine of the invention.

Referring now to the drawing there is illustrated a machine in accordance with the invention for carrying out the inventive machining process of the pipe cutting machine of the invention. On a floor, preferably a concrete slab 1, there is mounted a machine bed 2 on which there is supported a lateral guide rail support 3 having parallel guide rails 4. The length of the machine bed 2 is adapted to the length of the pipe blank to be cut which ranges from 3 meters to 10 meters.

A cutting head 5 is arranged at one end of the machine bed 2 which is only illustrated schematically in the drawing. A planing disc 8 is rotatably mounted on the cutting head 5 by means of roller-bearing elements 9. The detailed construction of the cutting head is described in the co-assigned European Patent No. 0 425 994 which is incorporated by reference.

The cutting head 5 has an annular piston 6 with skewed surfaces, which can be pneumatically or hydraulically slidably driven and thereby coacts with corresponding skewed surfaces on the clamping jaws 7. The external periphery of the pipe blank 33 is thereby radially clamped by the clamping jaws 7. The actual exterior diameter of pipe blank 33 can be determined by means of a displacement pickup unit 43 which first senses the axial position of the ring piston 6 after the clamping of the pipe blank 33, thereby sensing the actual exterior diameter of the pipe blank 33.

In lieu of the displacement pick up unit 43 a displacement pickup unit 45, mounted on the clamping arrangement at the gripper unit 19, can be used in an analogous manner. Furthermore, it is also possible to determine the actual exterior diameter of a pipe blank 33 before its forward end passes through the cutting head 5. To effect this the inventive arrangement includes a laser measuring device which is mounted on the machine bed 2. This laser measuring device measures the actual external diameter of the pipe blank 33 offset to the cutting region and then transmits the measured values to a CNC-control unit 41 which then controllably adjust the cutting machine accordingly.

Radial guides grooves 10 are provided at the planing disc 8 along which the cutting tool 12 and a chamfering tool 13 can be radially adjusted. The planing disc 8 is provided with an exterior gear wheel 14, which is, coupled by means of an intermediate gear wheel 15 with a pinion 16, and is by means of these gears drivingly coupled with drive motor 17. The gripper 19 is slidably mounted on a support unit 18. This gripper 19 serves to grip a cut ring piece 34 and transport it for further handling.

Drivable spindle 20 is mounted between the guide rails 4 on the guide rail support which serves to move the feed unit along the guide rails 4.

The feed unit is mounted on a carriage 22 which is slidably mounted on the guide rail support by means of guide members 32 which engage the guide rails 4.

A drive motor 24 is fixedly mounted on the carriage 22. This motor 24 selectively rotatably drives the spindle 25 which vertically adjusts a support 26 for a clamping bush 27. A piston 28 is arranged in the clamping bush 27 which is coupled to a cone 30 by means of a tension shaft 29. The cone 30 coacts with its conical surfaces with the mating frusto-conical surfaces of the clamping jaws 31 which can in this way be radially adjusted. The cone 30 thus serves to interiorly clampingly engage the pipe blank 33. The actual exterior diameter of the pipe blank 33 can be determined by means of the annular piston 6 and a displacement pickup unit 43 connected thereto. This arrangement permits, after clamping the pipe blank 33, the determination of the axial position of the ring piston 6, and thereby determines the actual interior diameter of the pipe blank 33. As is depicted in FIG. 2, a plurality of pipe blanks 33' are supported on an inclined slide and are maintained in position by an adjustable stop 40.

Prior to inserting a new pipe blank 33 into the pipe cutting machine the feed unit 21 is moved into the extreme left limit position. Thereafter the adjustable stop 40 is briefly lowered to permit a new pipe blank 33' to roll onto the support rollers 36. The next following pipe blank 33' is then again retained by by means of the adjustable stop 40.

Figure 2:
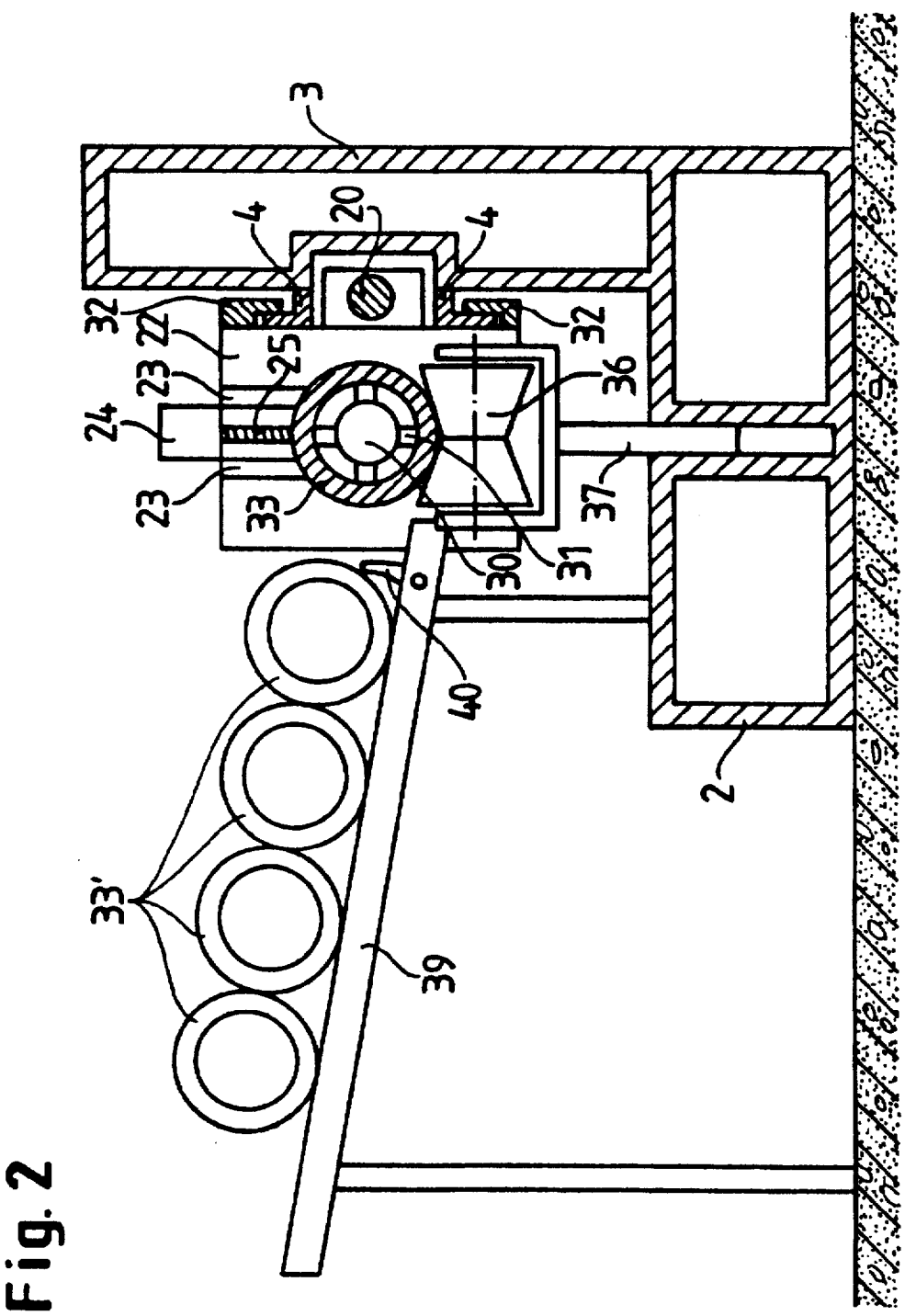
FIG. 2 end elevational view in the pipe blank feeding direction of the feed unit shown in FIG. 1, also shown partially in cross-section.

The support rollers 36 are supported by a support structure including support rods 37 which are vertically adjustably mounted in the machine bed 2 by means of guides depicted in FIG. 2.

By means of a control unit 41, which preferably includes a CNC-control, the support rollers 36 can be vertically adjusted in such a way, in dependence of the exterior diameter of the pipe blank 33, that the pipe axis, taken from the exterior diameter of the pipe blank 33, coincides exactly with the axis of the cutting head 5 and the planing disc 8.

The feed unit 21 is now moved towards the pipe end and is by means of the control unit 41, which controls the drive motor 24, also exactly vertically positioned. This height adjustment is carried out in such a way that any oval cross sectional irregularities or eccentricities of the interior diameter of the pipe blank 33 relative to the exterior diameter are taken into consideration, so that the axial position, taken from the exterior diameter of the pipe blank 33, does not vary during clamping of the clamping jaws 31 of the feed unit 21. The clamping bush 27 abuts against rear end face of the pipe blank 33 during clamping of the clamping jaws 31, so that thereby a defined position of the rear pipe end vis-a-vis the pipe feed unit 21 is obtained. In view of the determination of the axial position of the piston 28 by means of the displacement pickup unit 44, which constitutes a measurement of the spreading extent of the clamping jaws 31, the actual internal diameter can be directly read and this data can then be transmitted to the control unit 41.

By providing a clamping arrangement 46 in the region of the rear end of the pipe blank 33, which is aligned with the cutting head axis and grasps the rear pipe end at its outer periphery, the support 26 resting on the carriage 22 may be freely movable in all directions and is only locked after the clamping by the clamping jaws 31. In this way a simple centering of the actual external diameter of the pipe 33 relative to pipe cutting machine axis is obtained.

Thereafter the pipe 33 is slid in the direction of the cutting head 5, on which the planing disc 8 is operatively mounted, by means of the rotation of the spindle 20 which is controlled by the control unit 41.

A signal is transmitted to the control unit 41 by means of a scanning unit 38, preferably in the form of a photocell. This scanning unit 38 is mounted on the cutting head 5 and transmits a signal as soon as the front face 35 of the pipe blank 33 reaches the operative region of the scanning unit 38. The scanning unit signal indicates to the control unit 41 that the pipe front face 35 has reached a point along its path which is located at a predetermined distance from the cutting tool 12. The feed unit 21 therefore slides the pipe blank forward until the front face 35 is disposed in the region of the cutting tool with a small machining allowance, whereupon the clamping jaws 7, controlled by the control unit 41, are clamped, by the interaction of the conical surfaces of the clamping jaws 7 and the ring piston 6, against the outer periphery of the pipe blank 33. Here also the displacement pick up unit 43 senses the axial position of the ring piston 6 and transmits the electronic data to the control unit 41, which thereby measures directly the actual external diameter of the pipe blank 33.

A defined precisely positioned pipe start can be determined by subjecting the front face 35 of the pipe blank to a planing operation by means of the cutting tool 12 which removes any soiling and surface irregularities and thereby provides a precise normal surface 35 relative to the pipe axis.

Starting now with a fixed and defined pipe start, the control unit 41 adjusts the feed unit 21 in such a way that the pipe blank 33, after release by the clamping jaws 7, can be precisely slidably fed along a path, the longitudinal extent of which corresponds to the width of the to be cut ring 34 with the addition of the width of the cutting tool 12 which machines the ring piece 34.

The gripper unit 19 grips the to be cut ring piece 34 while the machine tools 12,13 are adjusted, via the unit 11 connected to the control unit 41, to their rapid operational mode during the rotation of the planing disc 8 until they almost are in contact with the outer peripheral surface of the pipe blank 33. Thereafter the machine tools 12, 13 are moved with reduced speed against the outer peripheral surface of the pipe blank 33 and a hard zone of the pipe blank 33 in the region of its outer periphery, for example a scale comprising rolling skin, a hard casting skin or a skin region which has hardened during cooling, is cut by the machine tools 12, 13. After this hard zone has been cut, the cutting speed and/or the feed movement are again increased to the extent the pipe material permits in order to obtain a pipe piece with as high as possible a cutting performance.

The cutting and/or feed speed are again slowed down when the machine tools 12, 13 are close to the internal diameter of the pipe blank 33 in order to cut an other hard zone which may be present in this region. This cutting is effected in such manner that the wear on the cutting tool is as low as possible and that the metal burr formation is reduced. In this way a clean completion of the cutting operation is obtained with a thin and clean ring chip production. The ring piece 34 is chamfered during, or optionally after, the cutting operation and is then axially slid and deposited by the gripper 19 at the next operational station.

The axial movement of the gripper unit 19 permits the saving of idle times because, by means of a signal of a cutting force measuring device 11 operatively connected to the control unit 41, it can be determined when the machining process has actually been completed, at which moment the control unit 41 receives a signal from the cutting force measuring device 11 and emits the signal for starting the gripper unit 19.

The machine tools 12, 13 can now be radially returned to their starting positions. However, there exists the danger that the machine tools 12, 13 make contact with the front face of the pipe blank 33, and consequently wear away and produce a spiral groove. In order to avoid this, the pipe blank 33 can be retracted, after the cutting and optionally the chamfering operation, and after the opening of the clamping jaws 6 of the cutting head 5, a short distance by means of the feed unit 21, whereafter the machine tools 12, 13 are retracted without contacting the front face of the pipe blank 33. The control unit 41 then emits a further command signal for the feed unit 21 which feeds the pipe blank 33, according to the data input in the control unit 41, over a predetermined feed distance in addition to the distance over which the pipe blank 33 had been previously retracted, at which position the pipe blank 33 is cut again to obtain a further cut ring piece 34.

In view of the fact that the CNC-control unit 41 which controls the feed unit is particularly suitable to not only uniformly adjust the same width for the pipe piece 34 which is being cut, but also can take into consideration correction values, it is further possible with the pipe cutting machine of the invention to input data for taking into consideration the lateral wear of the cutting tool 12. This can be effected by measuring the width of the cut ring piece 34 and, when a predetermined width is exceeded a correction value is input into the control unit 41 by means of a keyboard 42.

It is also possible to program the control unit 41 in accordance with empirical values, that is, after the cutting process of a predetermined number of cut ring pieces 34, the feed path is automatically corrected the required amount.

In view of the fact that clamping bush 27 and the support 26 have a diameter which, at a maximum, is equal to the exterior diameter of the pipe blank 33, and further in view of the fact that the length of the clamping bush 27 and the support 26 suffice to slide the pipe blank 33 up to the region of the clamping jaws 7 in the cutting head 5, the pipe blank 33 can be cut into ring pieces 34 until only a narrow remainder piece is left.

The support rollers 36 may perform additional functions to the function of supporting the pipe blank 33 when a new pipe blank 33 is inserted into the pipe cutting machine. In particular, when very long pipe blanks are inserted into the pipe cutting machine, such as a length up to ten meters, it is advantageous to support the pipe blank 33 between the feed unit 21 and the cutting head 5 in order to avoid a bending of the pipe blank which can cause an oblique positioning of the front face of the pipe blank. It is, of course, understood that the support rollers 36 are lowered at the moment the carriage 22 arrives in the region of a support roller 36. This lowering of the support roller 36 can also be automatically effected by the control unit 41. It is also possible to construct the carriage 22 of the feed unit 21 in such a way that it does not collide with the support rollers 36 during its travel.

Since the pipe cutting machine of the invention requires no stop member, which must be moved with each feed step of the pipe blank 33 in the region of the front face thereof, and after the clamping by means of clamping jaws 7 must again be removed from the region of the pipe front face 35, there do not appear any additional down times in connection with the stepwise feed advance of the pipe blank 33. This speeds up considerably the cutting process of the pipe cutting machine of the invention.

In view of the fact that the movement of the feed unit 21 is controlled by control unit 41, it is also possible to adapt optimally the acceleration and speed of the pipe blank 33 to the pipe mass and thereby maintain the idle time of the pipe cutting machine to a minimum.

The constructional details of the feed unit 21 illustrated in the drawing represents the preferred construction. However, the invention is not limited to this particular construction and the feed unit may be constructed in the form of a slip-free feed unit, which can grasp the pipe blank 33 immediately adjacent to the cutting head. This type of feed unit requires that it can be controlled by the control unit 41 in such a way that it repeatedly feeds the pipe blank 33 a predetermined feed distance for cutting of ring pieces 34 of a preselected width and within the predetermined tolerances and without requiring stop members arranged in the region of the planing disc 8 and the gripper unit 19.

Furthermore, the measuring of the actual external and internal diameters of the pipe blank can be carried out differently than by means of the displacement measurements effected via the annular piston 6 and the piston 28 and clamping jaws 31 and the control unit 41. For example, such measurements can be carried by contact-less sensors. If no larger tolerances are expected at the pipe external and internal diameters, it suffices to input the nominal external and internal diameters via the keyboard 42 into the control unit 41.

The invention is not limited to the embodiment illustrated and described herein of a process and a machine for cutting pipe blanks, but is intended to include concepts and features which include the concept and spirit of this invention.

What we claim is:

1. A process for cutting and optionally chamfering pipe pieces from thick-walled pipe blanks for manufacturing ball bearings from pipe pieces which have been cut from said pipe blanks, wherein each one of said pipe blanks has an actual external diameter, a nominal external diameter, a hard zone at least in the region of the outer periphery of each pipe blank, and each pipe blank is being moved at a predetermined feed advancing speed and cut a preselected cutting speed, comprising the following steps:

a) measuring the actual external diameter of the pipe blank adjacent to the location of the cut or inputting of the nominal external diameter of the pipe blank;

b) moving a cutting tool in close proximity to the outer periphery of the pipe blank in a first rapid operational mode;

c) switching the feed advance or the cutting speed from a first operational mode to a second operational mode which is adapted to a rapid cutting operation of the pipe blank; and d) including the following additional process step after the first operational mode and before the second operational mode:

switching the feed advancing speed or cutting speed to a lower speed than the speed of said first operational mode.

2. The process according to claim 1 for cutting and optionally chamfering pipe pieces from pipe blanks having a hard zone at least in the region of the outer periphery of the pipe blank, including the following additional process steps:

a) measuring the actual internal diameter of the pipe blank or inputting a nominal internal diameter of the pipe blank; and b) switching the feed or cutting speed to a lower value when the cutting tool approaches the internal diameter of the pipe blank for a completion of the cutting of the pipe blank;

whereby the pipe blank is cut with reduced burr production with a complete cut pipe piece and complete separation of a thin and clean cut ring piece with reduced machine tool wear despite the presence of a hard zone in the region of the internal diameter.

3. The process according to claim 1 for cutting and optionally chamfering pipe pieces from pipe blanks, including the additional process step of measuring the cutting force during the cutting operation of the pipe blank; and carrying away the cut pipe piece by means of a gripper arrangement as soon as the cutting force falls below a given value.

4. The process according to claim 2 for cutting and optionally chamfering pipe pieces from pipe blanks, including the additional process step of measuring the cutting force during the cutting operation of the pipe blank; and carrying away the cut pipe piece by means of a gripper arrangement as soon as the cutting force falls below a given value.

5. The process according to claim 1 for cutting and optionally chamfering pipe pieces from pipe blanks, including the following additional process steps:
   a) inserting a pipe blank into a pipe cutting machine;
   b) gripping the pipe blank by means of a slip-free feed unit;
   c) advancing the pipe blank by means of said feed unit;
   d) detecting arrival of the pipe end by means of a scanning unit prior to sliding it into the cutting head provided with clamping jaws;
   e) advancing the pipe front end a predetermined distance through a cutting head and thereafter clamping said pipe blank by means of the clamping jaws;
   d) planing of the front end of said pipe blank after it projects through said cutting head in order to define a pipe start;
   e) CNC-controlled feeding of said pipe blank over a preselected width which corresponds to the width of the cut pipe piece measured from said pipe start;
   f) cutting and optionally chamfering said pipe piece; and
   g) repeating the aforesaid operational cycle.

6. The process according to claim 2 for cutting and optionally chamfering pipe pieces from pipe blanks, including the following additional process steps:
   a) inserting a pipe blank into a pipe cutting machine;
   b) gripping the pipe blank by means of a slip-free feed unit;
   c) advancing the pipe blank by means of said feed unit;
   d) detecting arrival of the ring end by means of a scanning unit prior to sliding it into the cutting head provided with clamping jaws;
   e) advancing the pipe front end a predetermined distance through a cutting head and thereafter clamping said pipe blank by means of the clamping jaws;
   d) planing of the front end of said pipe blank after it projects through said cutting head in order to define a pipe start;
   e) CNC-controlled feeding of said pipe blank over a preselected width which corresponds to the width of the cut pipe piece measured from said pipe start;
   f) cutting and optionally chamfering said pipe piece; and
   g) repeating the aforesaid operational cycle.

7. The process according to claim 3 for cutting and optionally chamfering pipe pieces from pipe blanks, including the following additional process steps:
   a) inserting a pipe blank into a pipe cutting machine;
   b) gripping the pipe blank by means of a slip-free feed unit;
   c) advancing the pipe blank by means of said feed unit;
   d) detecting arrival of the ring end by means of a scanning unit prior to sliding it into the cutting head provided with clamping jaws;
   e) advancing the pipe front end a predetermined distance through a cutting head and thereafter clamping said pipe blank by means of the clamping jaws;
   d) planing of the front end of said pipe blank after it projects through said cutting head in order to define a pipe start;
   e) CNC-controlled feeding of said pipe blank over a preselected width which corresponds to the width of the cut pipe piece measured from said pipe start;
   f) cutting and optionally chamfering said pipe piece; and
   g) repeating the aforesaid operational cycle.

8. The process according claim 4 for cutting and optionally chamfering pipe pieces from pipe blanks, in which the wear incurred by the machine tools which are used for planing the front end of the pipe blank and cutting and chamfering the pipe piece is taken into consideration in the CNC-controlled feed unit.

9. The process according to claim 8 for cutting and optionally chamfering pipe pieces from pipe blanks, wherein the rear end of said pipe blank is interiorly gripped by means of clamping jaws of a feed unit and stepwise fed through a cutting head until only pipe remnant remains in the cutting head which has an axial length which corresponds to the required length for grasping the pipe blank, said pipe remnant is then is then retracted from said cutting head by said feed unit and the retracted pipe remnant is then cast off.

10. The process according to claim 9 for cutting and optionally chamfering pipe pieces from pipe blanks, wherein the rear end of said pipe blank is interiorly gripped by means of clamping jaws of a feed unit and stepwise fed through a cutting head until only pipe remnant remains in the cutting head which has an axial length which corresponds to the required length for grasping the pipe blank, said pipe remnant is then is then retracted from said cutting head by said feed unit and the retracted pipe remnant is then cast off.

11. The process according to claim 5 for cutting and optionally chamfering pipe pieces from pipe blanks, wherein said pipe blank is retracted a short distance after the cutting operation and optionally the chamfering operation on the pipe pieces and after the opening of the clamping jaws of the cutting head, the cutting and chamfering tools are then retracted without contacting the front face of each pipe piece, and the feed advance for cutting and optionally chamfering the next following pipe piece is increased by a longitudinal extent which corresponds to said short retraction distance.

12. The process according to claim 8 for cutting and optionally chamfering pipe pieces from pipe blanks, wherein said pipe blank is retracted a short distance after the cutting operation and optionally the chamfering operation on the pipe and after the opening of the clamping jaws of the cutting head, the cutting and chamfering tools are then retracted without contacting the pipe front face, and the feed advance for cutting and optionally chamfering the next following pipe piece is increased by a longitudinal extent which corresponds to said short retraction distance.

13. The process according to claim 9 for cutting and optionally chamfering pipe pieces from pipe blanks, wherein said pipe blank is retracted a short distance after the cutting operation and optionally the chamfering operation on the pipe and after the opening of the clamping jaws of the cutting head, the cutting and chamfering tools are then retracted without contacting the pipe front face, and the feed advance for cutting and optionally chamfering the next following pipe piece is increased by a longitudinal extent which corresponds to said short retraction distance.

14. The process according to claims 5 for cutting and optionally chamfering pipe pieces from pipe blanks, wherein the acceleration and speed of the feed advance is controlled in dependence of the actual mass of the pipe blank which being fed.

15. The process according to claims 8 for cutting and optionally chamfering pipe pieces from pipe blanks, wherein the acceleration and speed of the feed advance is controlled in dependence of the actual mass of the pipe blank which being fed.

16. The process according to claims 9 for cutting and optionally chamfering pipe pieces from pipe blanks, wherein the acceleration and speed of the feed advance is controlled in dependence of the actual mass of the pipe blank which being fed.

17. A process for cutting and optionally chamfering pipe pieces from thick-walled pipe blanks for manufacturing ball bearings from pipe pieces which have been cut from said pipe blanks, wherein each one of said pipe blanks has an external diameter, a nominal external diameter, a hard zone at least in the region of the outher periphery of each pipe blank, and each pipe blank is being moved at a predetermined feed advancing speed and cut at a preselected cutting speed, comprising the following steps:

a) measuring the actual external diameter of the pipe blank adjacent to the location of the cut or inputting of the nominal external diameter of the pipe blank;

b) moving a cutting tool in close proximity to the outer periphery of the pipe blank in a first rapid operational mode;

c) switching the feed advance and the cutting speed from a first operational mode to a second operational mode which is adapted to a rapid cutting operation of the pipe blank; and d) including the following additional process step after the first operational mode and before the second operational mode: switching the feed advancing speed and the cutting speed to a lower speed than the speed of said first operational mode.

18. The process according to claim 17 for cutting and optionally chamfering pipe pieces from pipe blanks having a hard zone at least in the region of the outer periphery of the pipe blank, including the following additional process steps:

a) measuring the internal diameter of the pipe blank or inputting of a nominal internal diameter of the pipe blank; and b) switching the feed and cutting speed to a lower value when the cutting tool approaches the internal diameter of the pipe blank for a completion of the cutting of the pipe blank;

whereby the pipe blank is cut with reduced burr production with a complete cut pipe piece and complete separation of a thin and clean cut pipe piece with reduced machine tool wear despite the presence of hard zone in the region of the internal diameter.

* * * * *